United States Patent [19]

Sakaoka

[11] Patent Number: 4,483,282
[45] Date of Patent: Nov. 20, 1984

[54] INTAKE SYSTEM OF AN INTERNAL COMBUSTION ENGINE
[75] Inventor: Hiromu Sakaoka, Asaka, Japan
[73] Assignee: Honda Giken Kogyo Kabushiki Kaisha, Tokyo, Japan
[21] Appl. No.: 485,911
[22] Filed: Apr. 18, 1983

Related U.S. Application Data

[62] Division of Ser. No. 176,542, Aug. 7, 1980, Pat. No. 4,408,576.

[30] Foreign Application Priority Data

Aug. 10, 1979 [JP] Japan ................................ 54-101258

[51] Int. Cl.³ ............................................. F02B 31/00
[52] U.S. Cl. ................................ 123/52 MB; 123/308
[58] Field of Search ..................... 123/52, 52 MB, 308

[56] References Cited
U.S. PATENT DOCUMENTS

| | | | |
|---|---|---|---|
| 3,505,983 | 4/1970 | Hartel | 123/52 MB |
| 4,231,329 | 11/1980 | Ishida | 123/52 MB |
| 4,240,387 | 12/1980 | Motosugi et al. | 123/52 MB |
| 4,254,746 | 3/1981 | Chiba et al. | 123/52 M |
| 4,356,798 | 11/1982 | Sakaoka et al. | 123/52 M |

Primary Examiner—Craig R. Feinberg
Attorney, Agent, or Firm—Armstrong, Nikaido, Marmelstein & Kubovcik

[57] ABSTRACT

An improved intake system for an internal combustion engine is disclosed which includes a combustion chamber, an intake passage and an exhaust passage opening to the combustion chamber, and an intake valve and an exhaust valve disposed in the intake and exhaust passages for opening and closing thereof. The system is featurized by provision of one or more control passage(s) opening to the intake passage in the vicinity of the intake valve, and a supply chamber of a predetermined volume which is in communication with the control passage(s). The system is particularly effective in improving the intake efficiency in small-sized, four stroke cycle engines.

4 Claims, 8 Drawing Figures

INTAKE SYSTEM OF AN INTERNAL COMBUSTION ENGINE

This is a division of application Ser. No. 176,542, filed Aug. 7, 1980, now U.S. Pat. No. 4,408,576.

BACKGROUND AND SUMMARY OF THE INVENTION

The present invention relates to an internal combustion engine suitable for use in small-sized vehicles such as motor cycles and, more particularly, to an intake system of four stroke cycle engine of a type having a combustion chamber, an intake passage and an exhaust passage opening to the combustion chamber and an intake valve and an exhaust valve disposed in the intake and exhaust passages, respectively, for opening and closing these passages.

Generally speaking, four stroke cycle engines operate more quietly and stably than two stroke cycle engines but can produce small output as compared with two stroke cycle engines having equal displacement.

Under this circumstance, the present invention aims at providing an intake system for four stroke cycle engines, capable of increasing the intake efficiency with a simple construction, thereby to overcome the above-stated problem of the prior art.

To this end, according to the invention, there is provided an intake system for internal combustion engine comprising a control passage means opening to a portion of the intake passage in the vicinity of the intake valve, and a supply chamber of a required volume and connected to the control passage means.

The above and other objects, features and advantages of the invention will become apparent from the following detailed description of the invention when taken in conjunction with the accompanying drawings which illustrates a few presently preferred embodiment of the invention.

DESCRIPTION OF THE PREFERRED EMBODIMENT

A few preferred embodiments of the invention will be described hereinunder with reference to the accompanying drawings.

Figure 1:
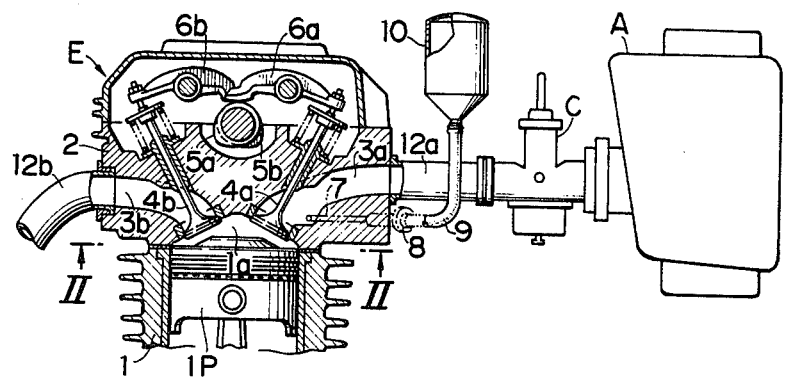
FIG. 1 is a vertical sectional side elevational view of a preferred embodiment of the invention.
Figure 2:
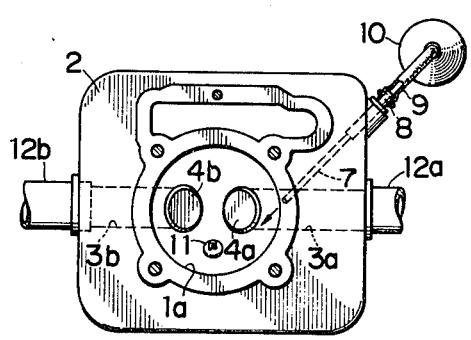
FIG. 2 is a sectional view taken along the line II—II of FIG. 1.

Referring first to FIGS. 1 and 2, a four cycle stroke engine generally designated at a symbol E has a cylinder 1, a cylinder head 2 attached to the upper end of the cylinder 1 and a piston 1P adapted to reciprocatingly move within the cylinder 1. The piston 1P and the cylinder head 2 in combination defines a combustion chamber 1a therebetween, to which exposed is an ignition spark plug 11. An intake passage 3a and an exhaust passage 3b are formed in the cylinder head 2. An intake valve 4a for opening and closing the intake passage 3a is disposed at the downstream side end of the latter, while an exhaust valve 4b for opening and closing the exhaust passage is disposed at the upstream side end of the latter. These valves 4a, 4b are actuated by means of rotary cams 5a, 5b on the cylinder head 2, through the action of rocker arms 6a, 6b, so as to open the intake passage 3a and the exhaust passage 3b alternatingly in a timed relation to the upward and downward stroke of the piston 1P.

A carburetor generally designated at a symbol C is connected to the upstream side end of the intake passage 3b, through the medium of an intake pipe 12a.

An air cleaner A is attached to the upstream side end of the carburetor C. Also, an exhaust pipe 12b leading to an exhaust muffler (not shown) is connected to the exhaust passage 3b.

The cylinder head 2 is provided with a control passage 7 opening to the portion of the intake passage 3a in the vicinity of the intake valve 4a. The control passage 7 has an opening which is directed in an offset direction from the center of the combustion chamber 1a. This control port 7 is communicated with a chamber 10 of a required volume through a connection pipe 8 and a flexible conduit 9.

The embodiment having the described construction operates in a manner explained hereinunder.

In the suction stroke of the engine, the piston 1P moves downward while the exhaust valve 4b and the intake valve 4a are kept closed and opened, respectively, to generate a vacuum in the combustion chamber 1a. The vacuum is then transferred to the intake passage 3a so that the mixture formed by the carburetor C is sucked into the combustion chamber 1a through the intake passage 3a. Meanwhile, a part of the vacuum generated in the combustion chamber 1a is transmitted also to the supply chamber 10 through the connection pipe 8 and the conduit 9 and is temporarily stored in the supply chamber 10.

Figure 3A:
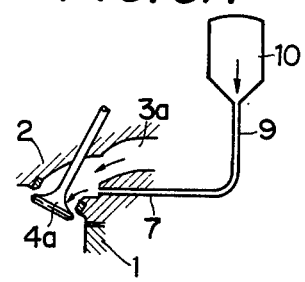
FIGS. 3A and 3B are illustrations of operation of the embodiment.
Figure 3B:
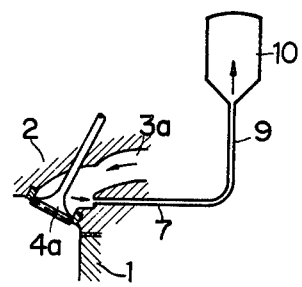

Subsequently, as the compression stroke of the engine is started, the intake and exhaust valves 4a, 4b are closed as shown in FIG. 3B. In this state, since the vacuum still remains in the supply chamber 10 the sucking action is maintained in the intake passage 3a so that the mixture coming from the carburetor C flows into the supply chamber 10 as shown by the arrow, through the control passage 7, connection pipe 8 and the conduit 9. This action is maintained until the internal pressure in the supply chamber 10 comes to balance the internal pressure of the intake passage 3a, so that the supply chamber 10 is charged with a predetermined amount of mixture.

Then, as the suction stroke of the engine is started again in this state to lower the piston 1a while opening the intake valve 4a, the mixture stored in the supply chamber 10 is sucked into the combustion chamber 1a, together with the mixture which is ordinarily sucked through the intake passage 3a as shown in FIG. 3A. Since the opening of the control passage 7 is directed in an offset direction from the center of the combustion chamber 1a to provide a circumferential flow component of the whole mixture, the mixture sucked into the combustion chamber 1a flows along the wall of the combustion chamber 1a forming a swirl toward the ignition spark plug 11 to further uniformalize the mixture of fuel and air to promote the combustion. This action is repeatedly performed to operate the engine.

Figure 4:
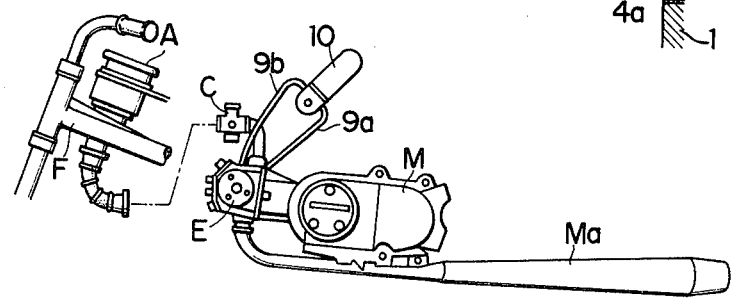
FIG. 4 is a schematic side elevational view of a motorcycle having an engine incorporating an intake system embodying the present invention.

FIG. 4 shows a motorcycle having a single cylinder engine incorporating the intake system of the present invention. In this embodiment, two control passages which are not shown open to a common supply chamber 10 through respective conduits 9a, 9b. A symbol E represents the engine provided with an air cleaner A and carburetor C. Symbols F, M and Ma denote, respectively, a frame of the motor cycle, a transmission and a muffler.

Figure 5:
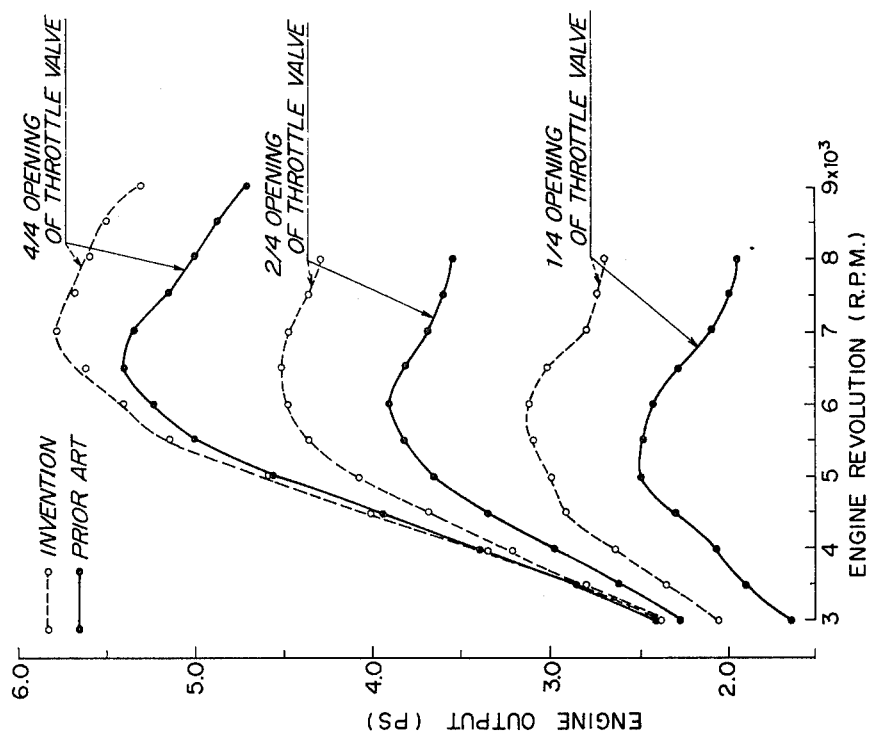
FIG. 5 is a graph showing the result of the test for comparing the performance of the engine of the invention with a conventional engine.
Figure 6A:
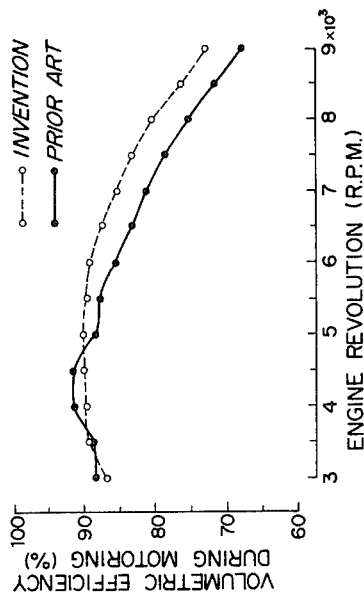
FIGS. 6A and 6B show the volumetric efficiencies of the engine having the intake device of the invention in comparison with those of a conventional engine, as measured by a motoring and firing test, respectively.
Figure 6B:
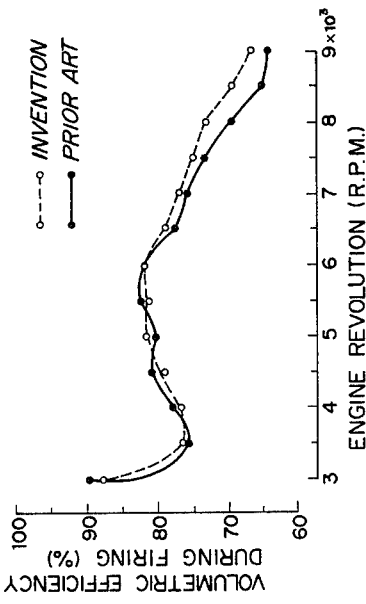

FIG. 5 and FIGS. 6A, 6B show the results of tests conducted with a 90 c.c. engine incorporating the intake system of the invention and the same engine without the intake system of the invention.

More specifically, FIG. 5 shows the output characteristics of these engines. It will be seen from the characteristic curves that the engine having the intake system of the invention produces an output which is 26% higher than that of the engine having no intake system of the invention at ¼ throttle opening of the carburetor, when the engine speed falls between 6000 and 6500 rpm. Also, outputs which are 15.2% and 6.7% higher are obtained at ½ and 4/4 throttle openings, respectively.

FIG. 6A is a graph showing the change of volumetric efficiency as measured by a motoring test. The graph clearly shows that the engine having the intake system of the invention exhibits a greater volumetric efficiency than the engine having no intake system of the invention when the engine speed exceeds 5000 rpm. This means that the intake system of the invention provides a remarkable improvement in the state of intaking of the mixture over the conventional engine in the above-specified range of engine speed.

FIG. 6B shows the change of the volumetric efficiency as measured by a firing test. As will be understood from this Figure, a substantially equal characteristic is obtained irrespective of whether the supply chamber 10 is used or not. This means that the intake system of the invention ensures a good combustion.

As has been described, according to the invention, the intake efficiency of the engine is improved to enhance the engine output, particularly in case of an engine for small-sized vehicles, by an intake system having a simple construction constituted by at least one control passage opening to the intake passage at a portion of the latter in the vicinity of the intake valve and operable in response to the pressure in the intake passage, and a supply chamber of a predetermined volume communicated with the control port.

In addition, since the control passage has an opening directed in an offset direction from the center of the combustion chamber, a swirl flow of mixture is generated in the engine to further uniformalize the mixture and to clean the ignition spark plug, thereby to improve the ignition performance of the ignition plug and to promote the combustion of the mixture. This in turn ensures both of reduction of the unburnt carbon hydroxide and increased engine output.

What is claimed is:

1. In an intake system for an internal combustion engine of a type having a cylinder head, a combustion chamber, an intake passage having a lower side, an exhaust passage, and an intake valve and an exhaust valve disposed in said intake and exhaust passages to open and close the respective passages, the improvement comprising a closed supply chamber of a predetermined volume disposed at a location in a plane above said intake passage, and control passage means having only two ends and being connected at one end of said ends to said supply chamber while being open at the other end to the lower side of said intake passage at a position upstream of and adjacent said intake valve, said control passage means having a portion extending from said other end to an open end and being disposed in a plane below said intake passage and integrally formed by said cylinder head, said control passage means further having a flexible conduit having two ends and being connected at one of its ends to the open end of said portion and the other of its ends forming said one end of said control passage means.

2. An intake system for an internal combustion engine as claimed in claim 1, wherein said closed supply chamber has a downwardly tapered bottom portion connected to the other end of said flexible conduit.

3. An intake system for an internal combustion engine as claimed in claim 1, wherein said portion of the control passage means is obtained by boring said cylinder head.

4. An intake system for an internal combustion engine as claimed in claim 1, wherein the engine further includes an ignition spark plug mounted at an upper part of the combustion chamber, and wherein said portion of said control passage means is substantially directed toward the spark plug whereby when the intake valve opens a flow of mixture injected from the control passage means while merging with mixture fed through the intake passage generates a swirl flow of mixture in the combustion chamber.

* * * * *